(12) United States Patent
Shen et al.

(10) Patent No.: US 8,903,394 B2
(45) Date of Patent: Dec. 2, 2014

(54) HANDOVER CONTROL METHOD IN A WIRELESS ACCESS SYSTEM, RELAY STATION AND BASE STATION

(75) Inventors: Gang Shen, Shanghai (CN); Wei Ni, Shanghai (CN); Wei Zou, Shanghai (CN); Shan Jin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1003 days.

(21) Appl. No.: 12/298,645

(22) PCT Filed: Apr. 28, 2007

(86) PCT No.: PCT/CN2007/001448
§ 371 (c)(1),
(2), (4) Date: Oct. 27, 2008

(87) PCT Pub. No.: WO2007/124695
PCT Pub. Date: Nov. 8, 2007

(65) Prior Publication Data
US 2009/0088164 A1    Apr. 2, 2009

(30) Foreign Application Priority Data

Apr. 28, 2006   (CN) .......................... 2006 1 0026180

(51) Int. Cl.
| | |
|---|---|
| H04W 36/00 | (2009.01) |
| H04W 4/00 | (2009.01) |
| H04W 36/30 | (2009.01) |
| H04B 7/155 | (2006.01) |
| H04W 16/26 | (2009.01) |
| H04B 7/26 | (2006.01) |

(52) U.S. Cl.
CPC .............. *H04W 36/30* (2013.01); *H04W 16/26* (2013.01); *H04B 7/2606* (2013.01); *H04B 7/155* (2013.01)
USPC ........... 455/436; 455/438; 455/439; 455/443; 455/440; 370/331; 370/332; 370/333; 370/334

(58) Field of Classification Search
CPC ..... H04W 36/30; H04W 36/18; H04B 7/2606
USPC .................. 455/436–444, 33.2; 370/331–334
See application file for complete search history.

(56) References Cited

U.S. PATENT DOCUMENTS 5,175,867 A * 12/1992 Wejke et al. .................. 455/439
5,317,623 A *  5/1994 Sakamoto et al. ............ 455/436
(Continued)

FOREIGN PATENT DOCUMENTS

| CN | 1239635 A | 12/1999 |
|---|---|---|
| CN | 1428943 A | 7/2003 |

(Continued)

OTHER PUBLICATIONS

International Search Report for Application No. PCT/CN2007/001448.
(Continued)

*Primary Examiner* — Jinsong Hu
*Assistant Examiner* — Dung Hong
(74) *Attorney, Agent, or Firm* — Fay Sharpe LLP

(57) ABSTRACT

The present invention provides a handover control method in a wireless access system, a relay station and a base station for performing handover control in a mobile multi-hop relay wireless access system such that the wireless access system is enabled to cover a wider area. To achieve the above object, the present invention provides a handover control method in a wireless access system, wherein the wireless access system comprises a mobile station and a base station, which receive and send message via a wireless channel, and further comprises a relay station for forwarding message from the mobile station and the base station under control of the base station, characterized in that the method comprising a relay station measure and arbitration step in which the relay station measures the message and arbitrates whether to relay the message, and a base station measure and handover step in which the base station measures the message and arbitrates whether to perform handover.

23 Claims, 9 Drawing Sheets

(56) References Cited

U.S. PATENT DOCUMENTS

| | | | |
|---|---|---|---|
| 5,822,697 A * | 10/1998 | Matsuzawa | 455/443 |
| 6,161,014 A | 12/2000 | Girardeau et al. | |
| 2001/0031624 A1 * | 10/2001 | Schmutz | 455/13.4 |
| 2003/0124976 A1 * | 7/2003 | Tamaki et al. | 455/15 |
| 2003/0133422 A1 | 7/2003 | Bims | |
| 2003/0235165 A1 * | 12/2003 | Wang | 370/331 |
| 2004/0229563 A1 | 11/2004 | Fitton et al. | |
| 2005/0048914 A1 | 3/2005 | Sartori et al. | |
| 2006/0002332 A1 | 1/2006 | Diaz Cervera et al. | |
| 2006/0030322 A1 * | 2/2006 | Kim et al. | 455/436 |
| 2006/0079235 A1 | 4/2006 | Kim | |
| 2006/0276189 A1 * | 12/2006 | Kiernan et al. | 455/436 |
| 2007/0133500 A1 * | 6/2007 | Rajkotia et al. | 370/348 |
| 2007/0177545 A1 * | 8/2007 | Natarajan et al. | 370/331 |
| 2007/0249347 A1 * | 10/2007 | Saifullah et al. | 455/436 |
| 2008/0285500 A1 * | 11/2008 | Zhang et al. | 370/315 |

FOREIGN PATENT DOCUMENTS

| | | | |
|---|---|---|---|
| CN | 1725872 A | | 1/2006 |
| EP | 0955784 A1 | | 11/1999 |
| KR | 10-2006-0032466 A | | 4/2006 |
| WO | 99/13672 A1 | | 3/1999 |

OTHER PUBLICATIONS

English Bibliography for Chinese Pat. App. Publication No. 1239635, Filed Sep. 8, 1998, Printed From Thompson Innovation on Jan. 2, 2012 (3 Pages).

English Bibliography for Chinese Pat. App. Publication No. 1428943, Filed Jul. 18, 2002, Printed From Thompson Innovation on Jan. 2, 2012 (3 Pages).

EP Pat. Application No. 07721021.9, European Search Opinion and Supplementary Search Report, Oct. 23, 2012, 7 pages.

PCT Pat. Application No. PCT/CN2007/001448, Written Opinion of the International Searching Authority, Aug. 2, 2007, 4 pages.

English Bibliography for European Patent No. EP955784B1, printed from Thomson Innovation on Nov. 20, 2012, 6 pages.

English Bibliography for Korean Patent Application KR2006032466A, published Apr. 17, 2006, printed from Thomson Innovation on Jul. 16, 2014, 4 pp.

Burbank, J.L. et al.: "IEEE 802.16 Broadband Wireless Technology and Its Application to the Military Problem Space", Military Communications Conference, 2005; MILCOM 2005; IEEE Atlantic City, NJ, USA, Oct. 17-20, 2005, Piscataway, NJ, USA, IEEE, Piscataway, NJ, USA, Oct. 17, 2005, pp. 1-7 XP010901449, DOI: 10.1109/MILCOM.2005.1605951ISBN:978-0-7803-9393-6; 7 pp.

* cited by examiner

HANDOVER CONTROL METHOD IN A WIRELESS ACCESS SYSTEM, RELAY STATION AND BASE STATION

TECHNICAL FIELD

The present invention relates to a wireless access system, and more specifically to a method for performing handover control in a mobile multi-hop relay wideband wireless access system, and a relay station and a base station therefor.

BACKGROUND OF THE INVENTION

The IEEE802.16-based Wireless Metropolitan Area Network (WiMAX) provides a wireless access solution for wideband access service, and the WiMAX standards adopts an Orthogonal Frequency Division Multiple Access (OFDMA) technology. But its coverage is limited by power and transmission technique, especially in metropolitan areas. At the edge of a cell or in regions which are shadowed, data throughput of a user drops dramatically and complex wireless environment may also result in coverage blind areas. In view of the above problems, the solution of simply increasing the density of base stations will only result in increase of facilities and network wiring costs.

Therefore, there is provided a wireless access system with a lower cost, comprising a mobile station, a base station, and a relay station for receiving and forwarding message between the mobile station and the base station under the base station control. After the relay capability is integrated into a wireless access network system, the system may expand coverage and enhance data throughput.

However, in the current wireless access system, there is not specified a method of how to implement roaming handover control. It is well known that handover control is an important issue in the wireless access technology. To expand coverage, the relay station must supports roaming and handover of the mobile station. The handover includes handover of the mobile station between the base station and the relay station as well as between a relay station and another relay station, and handover of the mobile station cross base stations. The mobility of the relay station per se is also an important issue In view of the above problems, a feasible solution for handover control in a mobile multi-hop relay wireless access system is desired.

SUMMARY OF THE INVENTION

The object of the present invention is to provide a handover control method in a wireless access system, a relay station and a base station for performing handover control in a mobile multi-hop relay wireless access system such that the wireless access system is enabled to cover a wider area.

To achieve the above object, the present invention provides a handover control method in a wireless access system including a base station and a relay station, characterized in that the method comprising a relay station measure and arbitration step in which the relay station measures the message and arbitrates whether to relay the message, and a base station measure and handover step in which the base station measures the message and arbitrates whether to perform handover, wherein the relay station measure and arbitration step comprises: at least one relay station receiving the message sent by the mobile station; the relay station measuring signal strength of the message sent by the mobile station; the relay station analyzing and arbitrating signal strength of the message; if the message has a strong signal, the relay station forwarding the message or sending a measure report to the base station, and if the message has a weak signal, the relay station ignores the mobile station message, and wherein the base station measure and handover step comprises: the base station receiving message sent directly by the mobile station or forwarded by the relay station; the base station measuring signal strength of the message; the base station analyzing and arbitrating signal strength of the message received directly from the mobile station or the message forwarded by the relay station, and then determining whether relay handover is required, and the base station sending to the relay station message as to whether to provide relay service; and if the message is ranging request message, the base station sends ranging response message comprising adjustment to radio frequency power level and time offset.

If the base station determines that a relay service is required while the mobile station is in a state of not using the relay service, the base station sends providing relay service message to the relay station, and then handover of the mobile station from the base station to the relay station is performed; and if the base station determines that no relay service is required while the mobile station is in a state of already using the relay service, the base station sends cancelling relay service message to the relay station, and then handover of the mobile station from the relay station to the base station is performed.

The base station determining the relay station with strong signal as the target relay station through analysis and arbitration, the base station sending cancelling relay service notification to the current relay station, and the base station sending providing relay service notification to the target relay station, thereby handover of the mobile station from the current relay station to the target relay station is performed.

To achieve the object of cross-base station handover of the mobile station, the present invention provides a mobile station cross-base station handover preparation step in the handover control method, comprising: the mobile station sending a mobile handover request to the current base station directly or via the relay station; the current base station receiving the mobile handover request; the current base station sends a pre-handover notification request to the target base station; the target base station sending a pre-handover request response to the current base station; the current base station sending the mobile handover response to the mobile station; the mobile station sending a mobile handover instruction to the current base station directly or via the relay station; the current base station receiving the mobile handover instruction; the target base station sending an uplink MAP to the mobile station; and the mobile station changing its preamble so as to be synchronized with the target base station preamble.

According to another aspect of the present invention, there is provided a relay station for implementing the handover control method in the above wireless access system, comprising: relay control means for controlling operation of a relay station; relay receiving means for receiving message from a mobile station and a base station via a wireless channel; relay sending means for sending message to a mobile station and a base station via a wireless channel; relay measure means for measuring signal strength of message sent by the mobile station and for ranging the mobile station; and relay arbitration means for analyzing, arbitrating and determining whether it is required to relay received message, wherein the base station allocates a special connection identifier to the relay station. Under the control of the relay control means, the relay receiving means receives message, the relay measure means measure signal strength of the message, and the relay arbitration means analyzes and arbitrates the measure result of the message to determine whether to forward the message by the relay sending means. Further, the relay receiving means receives a special connection identifier sent by the base station.

According to an other aspect of the present invention, there is provided a base station for implementing the above handover control method in a wireless access system, comprising: base station control means for controlling operation of a base station; base station receiving means for receiving message from a mobile station and a relay station via a wireless channel; base station sending means for sending message to a mobile station and a relay station via a wireless channel; base station measure means for measuring signal strength of the message sent by the mobile station; and base station arbitration means for arbitrating and determining whether relay handover is required, wherein under control of the base station control means, message received by the base station receiving means is sent to the base station measure means for measure, and after being analyzed and arbitrated by the base station arbitration means, the message is sent by the base station sending means to the relay station and the mobile station, and the base station sending means sending a special connection identifier to the relay station.

By virtue of the method and devices provided by the present invention and with the introduction of the handover control method, the present invention realizes handover functionality in a mobile multi-hop wireless relay system, which enables the base station to allocate resources in a centralized way to the mobile station and the relay station within the its coverage. Thus, the present invention not only enhances data throughput, but also expands the coverage.

The present invention provides a simple and ingenious solution for IEEE 802.16, and meanwhile it is completely backward compatible with the current standards, thereby the traditional mobile station without any change is supported for relay and handover. By virtue of the present invention, handover of mobile station within the same base station or relay-involved cross-base station handover are enabled. Furthermore, the handover needs no extra response time. Since the base station bears the responsibility for all control functionality in all handover processes while the relay station is only responsible for sending data based on the instruction of the base station, the relay station becomes simpler and much cheaper.

The other features and advantages of the present invention will be more apparent from the following detailed description taken in conjunction with the accompanying drawings.

DETAILED DESCRIPTION OF THE PREFERRED EMBODIMENTS

Hereinafter references will be made to the figures to describe in detail working principles of a wireless access handover control method, and a relay station and a base station of the present invention.

The wireless access system according to a preferred embodiment of the present invention comprises a base station for receiving and sending message via a wireless channel and a relay station for forwarding message under the control of the base station. The wireless channel includes an uplink channel and a downlink channel, and the message includes ranging request message or an uplink data burst.

As to roaming handover in a mobile relay wireless access system, relay handover of a mobile station is classified into two types, i.e. handover within a same base station and cross-base station handover of a mobile station. A control method for the mobile station handover with a same base station comprises a relay station measure and arbitration step, in which the relay station measures message and arbitrates whether to relay the message; and a base station measure and handover step, in which the base station measures the message and arbitrates whether to perform handover.

The relay station measure and arbitration step comprises at least one relay station receiving the message sent by the mobile station; measuring signal strength of the message sent by the mobile station, analyzing and arbitrating the signal strength, forwarding the message with strong signal to the base station or sends a measure report to the base station, and if the message has a weak signal, the relay station ignores the mobile station message.

The base station measure and handover step comprises: the base station receiving message, measuring signal strength of the message, analyzing and arbitrating whether to perform relay handover, sending to the relay station message as to whether to provide relay service. If the message is ranging request message, the base station sending a ranging response message, and the ranging response message comprising adjustment to radio frequency power level and time offset.

For the sake of a clearer description, the implementation process of the handover control method is illustrated and analyzed through a concrete relay handover process.

I. Handover of Mobile Station within a Same Base Station

Figure 1:
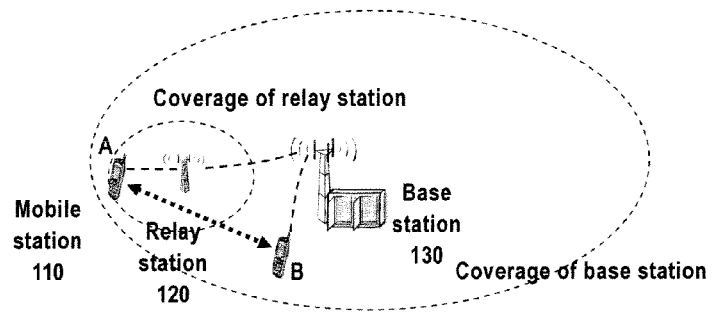
FIG. 1 shows a networking state of a mobile station handover within a same base station in a wireless access system according to a preferred embodiment of the present invention.

Within coverage of the same base station, there are three types of relay-involved handovers:

Handover from a base station to a relay station within coverage of the same base station Handover from a relay station to a base station within coverage of the same base station Handover from a relay station to another relay station within coverage of the same base station FIG. 1 shows a networking state of a mobile station handover in the same base station in a wireless access system according to a preferred embodiment of the present invention, wherein a mobile station 110 is located at position A which might be at at the edge of a cell or in a shadowed area or within a building, and message from the mobile station and the base station is forwarded via a relay station 120. When the mobile station roams to position B closer to the base station, its connection with a base station 130 may not need a relay to forward message, thus it is required to process handover from the relay station to the base station. Besides, when the mobile station 110 moves from position B to position A, it is required to process handover from the base station to the relay station.

The wireless access system in a preferred embodiment of the present invention utilizes a control and scheduling system centered at the base station 130. The mobile station 110, the relay station 120 and the base station 130 receive and send message therebetween through a full-duplex wireless channel, the wireless channel comprising a downlink frequency (shortly as DL) and an uplink frequency (shortly as UL). The message includes control message and bearer data. Though allocating control message and arbitrating access request, the base station 130 coordinates the resources of the mobile station 110 and the relay station 120 in the cell. The relay station 120 only has a function of forwarding uplink message to the base station 130 and forwarding the downlink message to the mobile station 110. Besides, the control message from the base station 130 down to the mobile station 110 is directly sent, which required no relay. For further detailed description, the uplink bearer data and control message from the mobile station 110 are sent through the following path: firstly received by the relay 120 and then forwarded to the mobile station 130. It is the same for the step of transmitting downlink bearer data, just in a reverse direction; the direct control connection of the downlink between the mobile station 130 and the mobile station 110 facilitates lessening latency for relaying.

Figure 2:
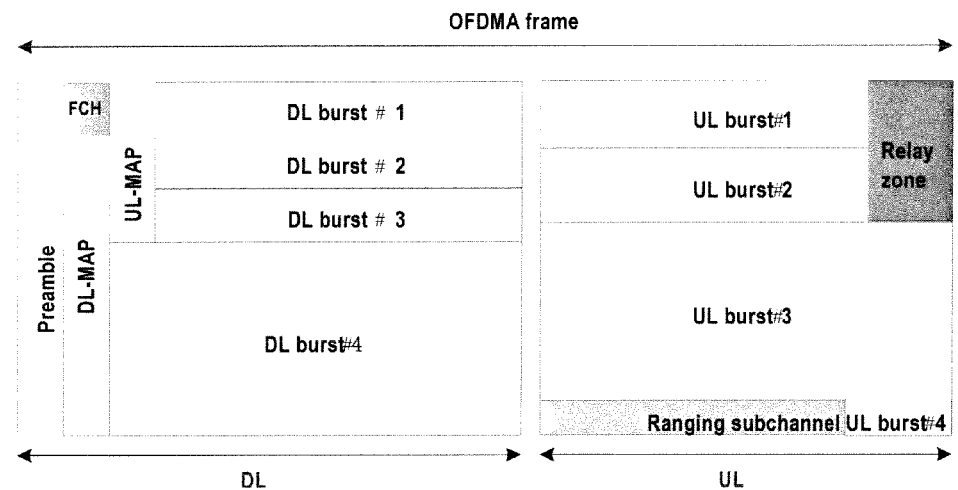
FIG. 2 shows a structural diagram of an OFDMA relay frame according to a preferred embodiment of the present invention.

A preferred embodiment of the present invention employs an OFDMA relay frame structure, as shown in FIG. 2. The relay frame structure is defined the same as the OFDMA frame structure in the traditional standard, wherein the OFDMA frame is of a time-frequency two-dimensional structure the longitudinal axis unit being sub-channel, and the horizontal axis unit being symbol. The minimal units scheduled by the Media Access Control MAC) layer are a sub-channel and a time slot comprising one or more symbols, the specific number of symbols being determined by the sub-carrier mapping pattern. Each frame is divided into an uplink frame and a downlink frame in time domain. The boarders between uplink and downlink are Transmit/Receive Transition Gap (TTG) and Receive/Transmit Transition Gap (RTG). The start of each downlink frame is Preamble, and then Frame Control Header (FCH), Downlink MAP (DL-MAP) and Uplink MAP (UL-MAP). The DL-MAP immediately follows the FCH, and the UL-MAP immediately follows the DL-MAP. Following are DL burst blocks and UL burst blocks. The arrangement pattern and encoding modulation manner of DL burst blocks are designated by DL-MAP, and the corresponding arrangement patterns and encoding modulation manners of UL burst blocks are designated by UL-MAP.

As shown in FIG. 2, in the OFDMA relay frame structure employed in the embodiment of the present invention, a dedicated control information relay zone is reserved for forwarding uplink control information, for example, ranging request relay. The relay zone is located at or adjacent to the end of an uplink frame. A ranging sub-channel information is located in front of the control information, thereby the ranging request of the mobile station 110 received by the relay station 120 is able to be transmitted in the same frame through the relay zone, which thus has the following advantages: in the process of forwarding the ranging request or in the relay process of other uplink control signal, no extra latency is increased.

In the preferred embodiment of the present invention, the entry and initialization process of the relay station is completely identical to a traditional mobile station, except that the relay station has a special relay connection identifier. It is the base station that assigns a special connection identifier (CID) to the relay. Next, the base station 130 handles the relay through such CID in a way different from the traditional mobile station. Thus, the present invention makes some improvement and updating to the base station 130 so as to enable the base station to identify the relay station.

As to the present invention, to guarantee a backward compatibility, there is no change to the mobile station 110. The mobile station 110 only processes in accordance with a traditional flow. In other wards, the relay station 120 is transparent to the mobile station, which is one of the major advantages of the present invention. Besides, the scanning and synchronization process of the downlink channel is completely identical to the traditional process and in this way, the base station may broadcast synchronization and MAP message without the necessity of any modification, and the mobile station 110 is synchronized to the downlink to obtain the downlink and uplink parameters. During the process of the mobile station accessing the base station, the relay station 120 participates in the ranging process. During the ranging process, firstly, the mobile station 110 should be synchronized with the downlink and understand the features of the uplink through uplink channel descriptor (UCD) MAC management information. The mobile station 110 scans the UL-MAP message to find the Initial Ranging Interval (IRI).

Figure 3:
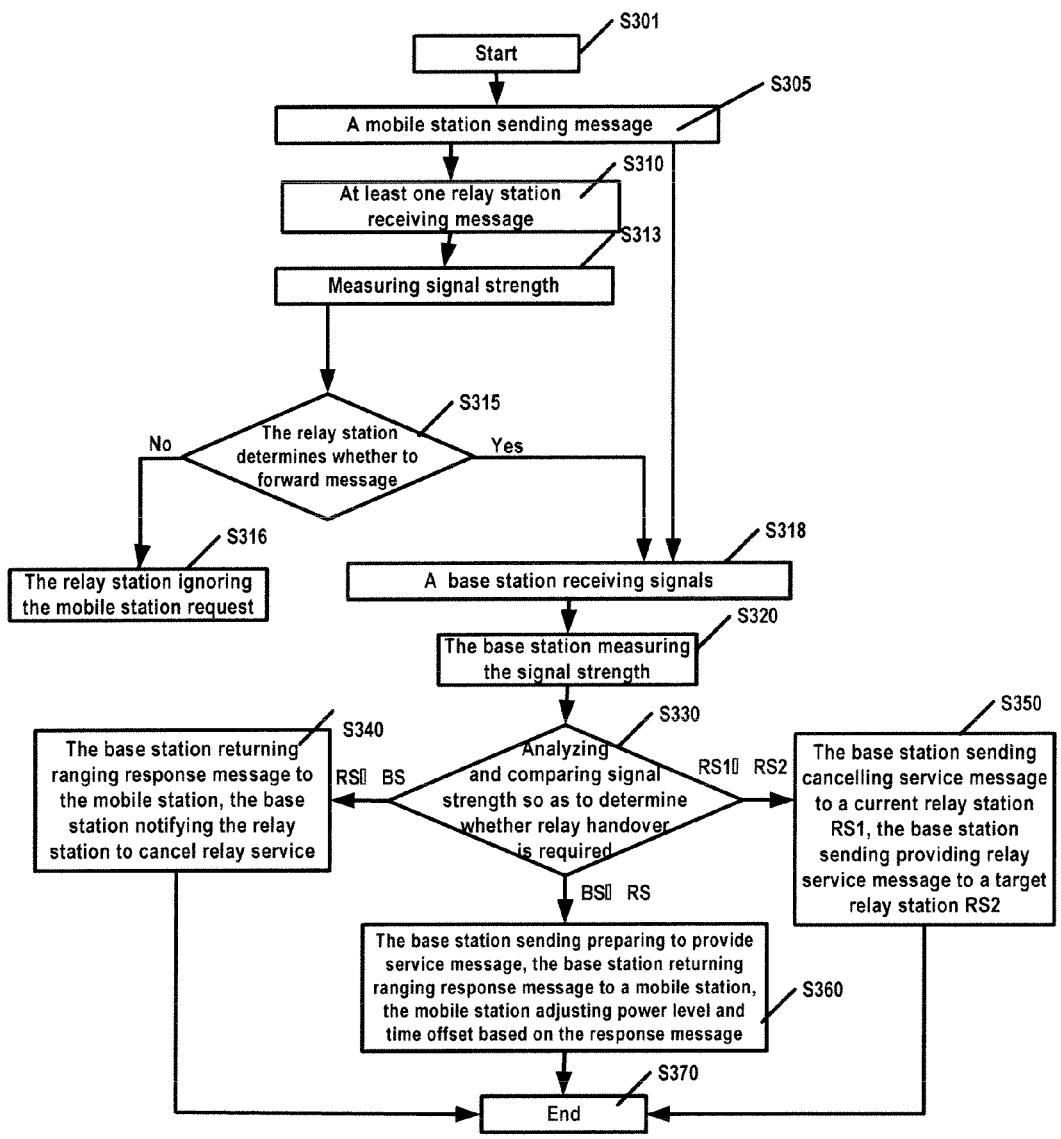
FIG. 3 shows a flow chart of handover of a mobile station within a same base station according to a preferred embodiment of the present invention.

Hereinafter, reference is made to FIG. 3 to describe a flow chart of handover of the mobile station within a same base station according to a preferred embodiment of the present invention, comprising handover of the mobile station from a relay station to a base station within the same base station, handover from the base station to the relay station, and handover from the current relay station RS1 to the target relay station RS2. The flow of FIG. 3 starts at step S301; at step S305, a mobile station sends message; during the process, each mobile station sends message, thus there might be several mobile stations sending message, and such message will be detected by the relay station. At step S310, at least one relay station receives the message sent from the mobile station. At step S313, signal strength is measured. At step S315, the relay station arbitrates and selects those mobile stations better for relay based on signal strength, and then determines whether to forward message. It forwards the message through a reserved dedicated control information relay zone to the base station only when the relay station detects message with a strong signal. If the signal is weak, the flow turns to step S316, and the relay station ignores the message sent from the mobile station, which requires no relaying. The arbitration criterion may be that the signal power is larger than a predetermined value, but the present invention is not limited thereto. If it is arbitrated that the signal is strong, the flow turns to step S318, and the message is forwarded to the base station and reports signal strength. At step S318, the base station receives message. At step S320, the base station measures signal strength of the message. At step S330, the base station analyzes and compares the signal strength. The base station may receive multiple pieces of message from the same mobile station. Through arbitrating the signal strength, the base station compares the signal strength and link budgets, and then determines whether it is required to perform relay handover to the mobile station. Upon determining whether to perform relay handover, the base station may consider channel load, multi-hop bandwidth efficiency and transmission power, etc. If it is required to perform handover from the relay station to the base station, the flow turns to step S340. If it is required to perform handover from the current relay station RS1 to the target relay station RS2, the flow turns to step S350. If it is required to handover from the base station to the relay station, the flow turns to step S360. At step S340, if the mobile station is in a state of already using the relay station service while the communication signal between the mobile station and the base station is quite good, the base station returns the ranging response message to the mobile station and notifies the relay station to cancel the relay service, thereby realizing handover from the relay station to the base station, and the flow ends at step S370. At step S350, if the comparative analysis turns out that the signal quality of the current relay station RS1 is weaker than the message strength of the target relay station RS2, the base station sends cancelling relay service message to the current relay station RS1, sends providing relay service message to the target relay station RS2, and sends ranging response message to the mobile station, and thereby handover between relay stations is realized and the flow ends at S370. At step 360, if the mobile station is in a state of not using the relay station service, the base station sends preparing to provide relay service message to the relay station, and returns the ranging response message to the mobile station. If the direct connection quality is not satisfactory due to rather long distance between the base station 110 and the relay station 120 or there is shadowing while the signal quality between the mobile station 110 and the relay station 120 is good and may facilitate increasing data throughput, providing relay is required. In some worse cases, if the connection signal between the mobile station and the base station is too weak that the base station can not detect the mobile station message directly, the base station can only receive message forwarded by the relay station through the dedicated control information relay zone. In this scenario, the base station also requires providing relay to the mobile station. The ranging response message returned by the base station to the mobile station comprises adjustment to the radio frequency power level and time offset so as to adapt to the connection between the relay station and the mobile station. Since all the uplink transmission from these mobile stations are firstly received by the relay station and then forwarded to the base station, the power level of the base station needs to be adjusted to be adapted to the transmission distance of the connection between the mobile station 110 and the relay station 120. Likewise, time synchronization offset correction in the mobile station also needs to be adjusted. From the perspective of the mobile station, the relay station is deemed as a base station, and all uplink message passes through the virtual base station. At step 370, the operation ends. The following operation process is identical to the prior art wireless access process.

Figure 4:
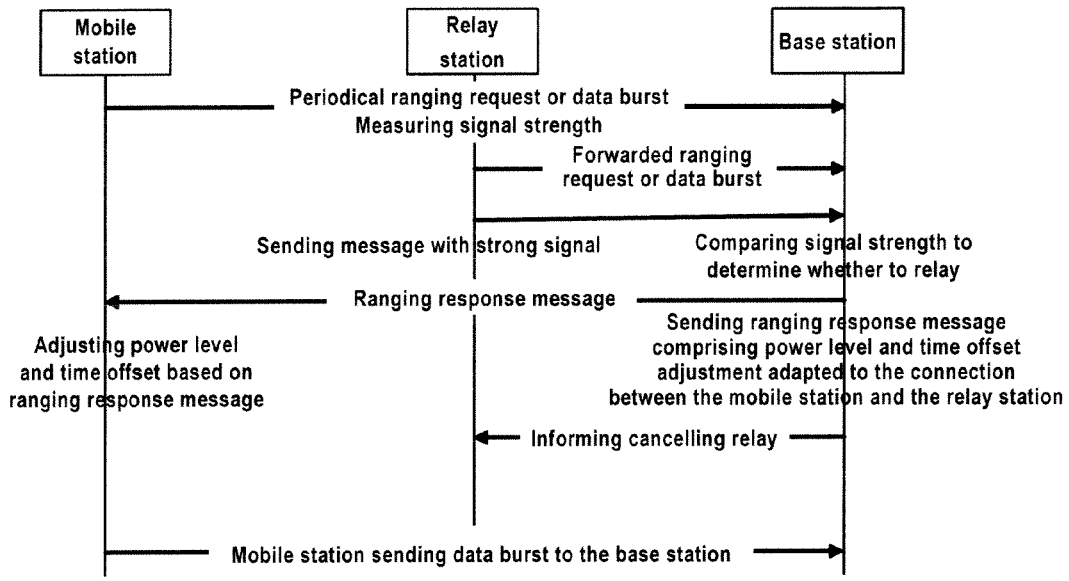
FIG. 4 shows a diagram of a handover process of a mobile station from a relay station to a base station within a same base station according to a preferred embodiment of the present invention.
Figure 5:
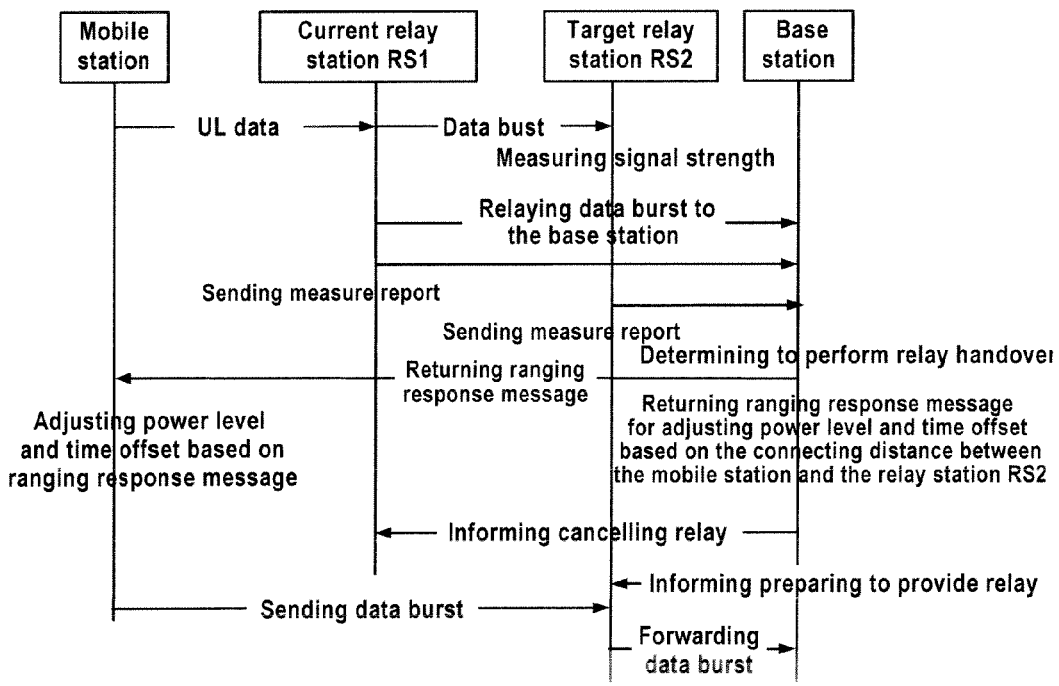
FIG. 5 shows a diagram of a handover process of a mobile station from a relay station RS1 to a relay station RS2 within a same base station according to a preferred embodiment of the present invention.
Figure 6:
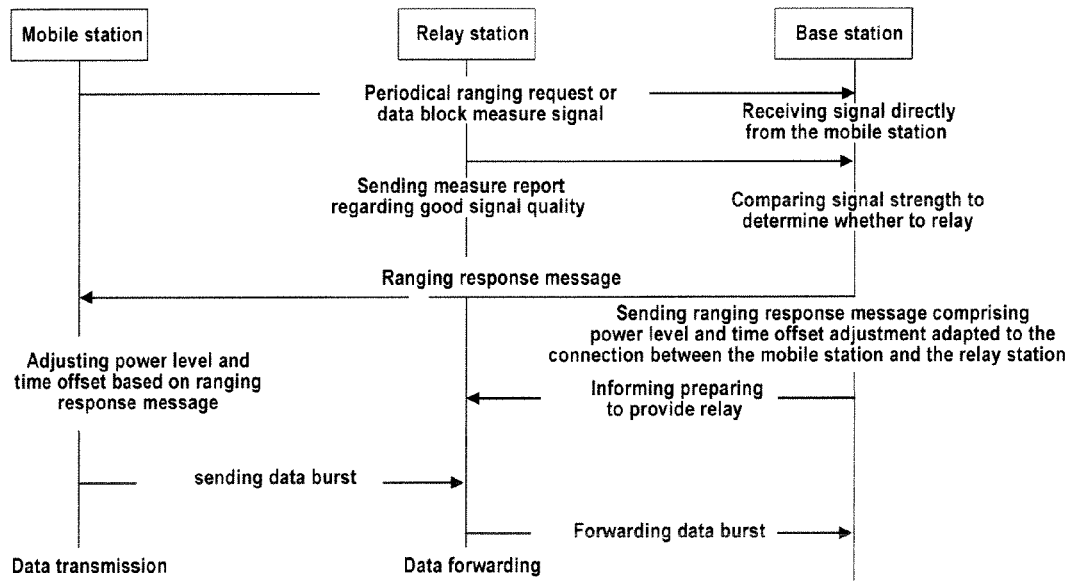
FIG. 6 shows a diagram of a handover process of a mobile station from a base station to a relay station within a same base station according to a preferred embodiment of the present invention.

FIG. 4 shows in detail the process of handover of a mobile station from a relay station to a base station within a same base station, FIG. 5 shows in detail the process of handover of a mobile station between relay stations within a same base station, and FIG. 6 describes in detail the process of handover from a base station to a relay station within a same base station. The main steps and contents thereof have been explained in the description of above flow charts.

II. Cross-Base Station Handover of a Mobile Station

During handover of a mobile station within a same base station, the mobile station before and after handover is synchronized to the preamble of the same base station. Whereas during the cross-base station handover, the mobile station after handover is synchronized to the preamble of a target base station, characterized in that the preambles before and after the handover are different. Both of the scenarios comprise handover process of a mobile station within the same base station.

Figure 7:
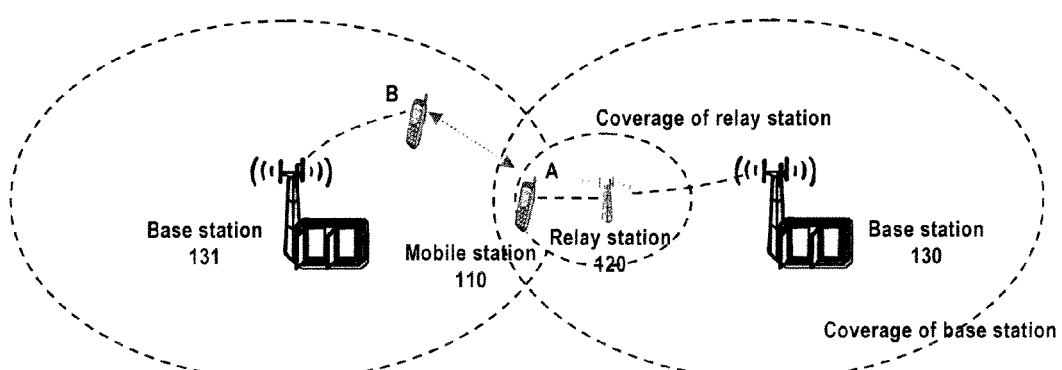
FIG. 7 shows a networking state of a mobile station cross-base handover in a wireless access system according to a preferred embodiment of the present invention.

FIG. 7 shows a networking state of cross-base station handover of a mobile station in a wireless access system according to a preferred embodiment of the present invention. Similarly, roaming of the mobile station 110 from position A to position B requires to process cross-base station handover from base station 130 to the relay station 120 within coverage of base station 131. Contrarily, roaming of the mobile station 110 from position B to position A requires to process handover from base station 131 to the relay station 120 within coverage of base station 130.

Figure 8:
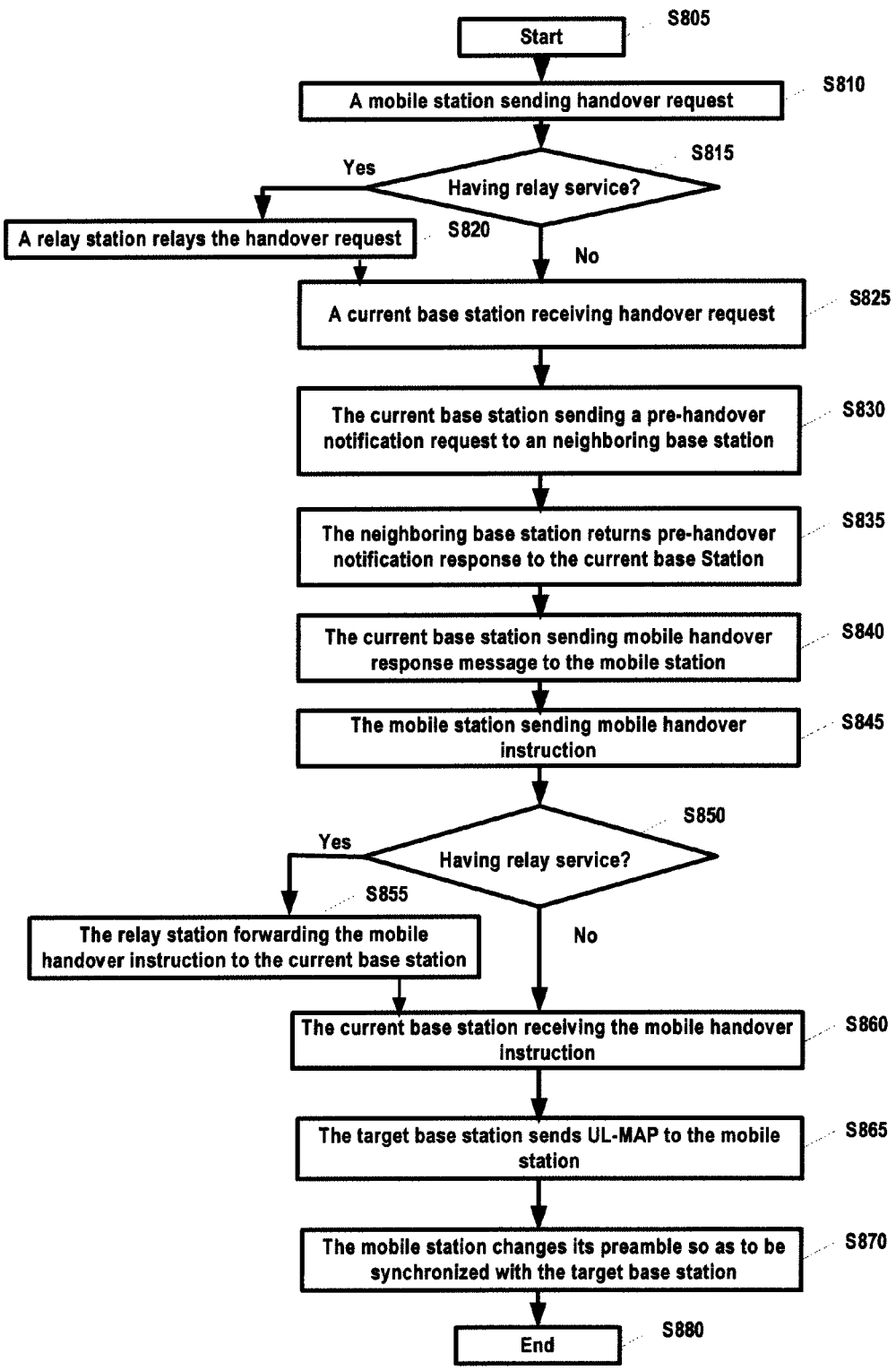
FIG. 8 shows a flow chart of a mobile station cross-base station handover preparation process according to a preferred embodiment of the present invention.

The cross-base station relay handover of a mobile station is an extension of the handover step of the mobile station within a same base station. The message communication between the current base station and the neighboring target base station is identical to the message communication in the current standards. The cross-base station handover of a mobile station has three relay-involved scenarios:

handover from the current base station to a relay station within the coverage of the target base station handover from a relay station within the coverage of the current base station to the target base station handover from a relay station within the coverage of the current base station to a relay station within the coverage of a target base station In the wireless access system according to the preferred embodiment of the present invention, the cross-base station handover method of a mobile station further comprises a mobile station cross-base station preparation process, wherein the wireless access system comprises at least two base stations, and the base station which controls the mobile station is the current base station. FIG. 8 describes a flow chart of a mobile station cross-base station handover preparation process. The flow starts at step S805. At step S810, the mobile station sends a mobile handover request. If it arbitrated to have relay service at step S815, the mobile handover request is relayed to the current base station at step S820. If it is arbitrated to have no relay service, the mobile station directly sends the request to the current base station. At step S825, the current base station receives the mobile handover request message. At step 830, the current base station sends pre-handover notification request message to at least one neighboring base station. At step S835, the at least one neighboring base station returns re-handover notification response message to the current base station. At step S840, the current base station arbitrates and determines a target base station and returns mobile handover response message to the mobile station. At step S845, the mobile station sends mobile handover instruction message. If it is arbitrated to have relay service at step S850, the relay station forwards the mobile handover instruction to the current relay station at step S855. At step S860, the current base station receives the mobile handover instruction message. At step S865, the target base station sends UL-MAP message to the mobile station. At step S870, the mobile station changes its preamble so as to be synchronized with the preamble of the target base station. At step S880, this time of cross-base station preparation process ends. Hereinafter, within the coverage of the target base station, the handover process of the mobile station from the base station to the relay station is similar to the handover process within the same base station as described above. Combining the cross-base station preparation step of the mobile station and the step of handover within the same base station, the cross-base station handover from the current base station to the target base station can be implemented.

Figure 9:
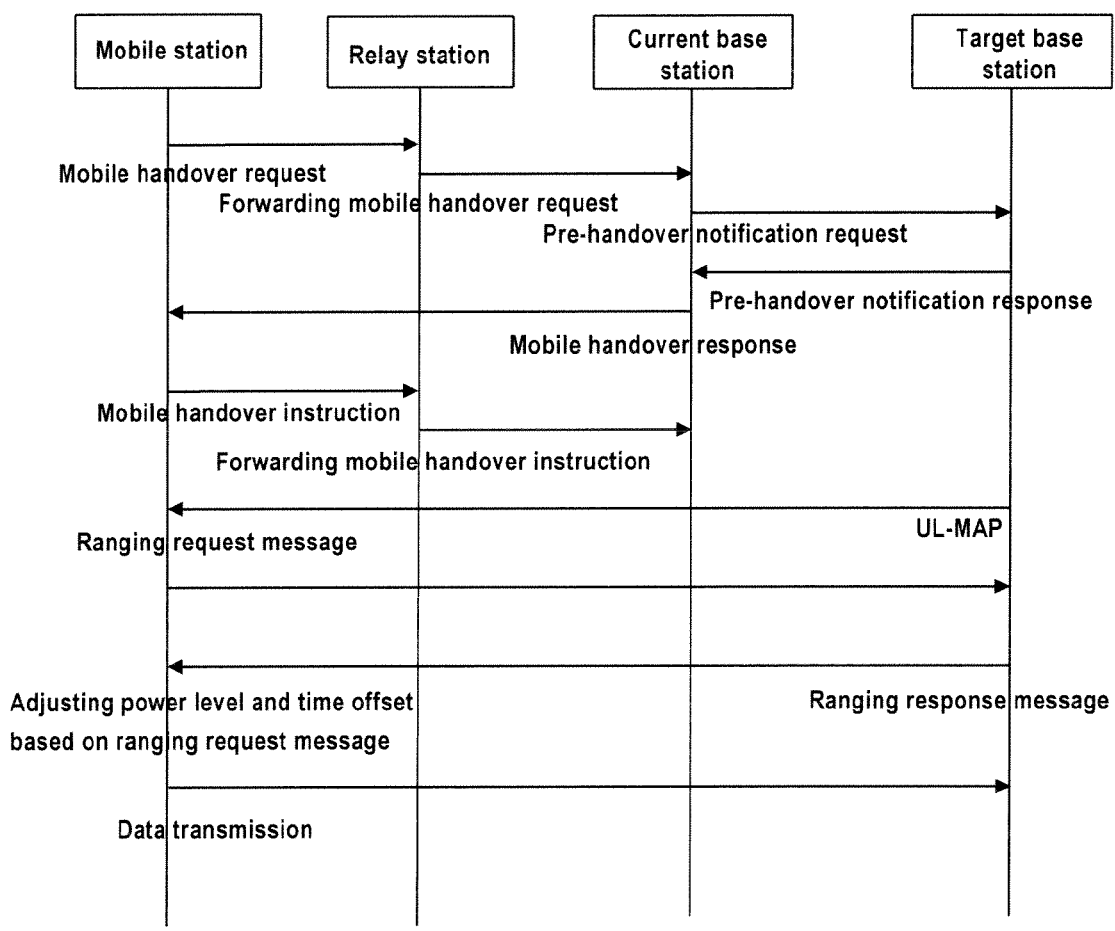
FIG. 9 shows a diagram of a cross-base station handover process of a mobile station from a relay station of a current base station to an neighboring target base station according to a preferred embodiment of the present invention.
Figure 10:
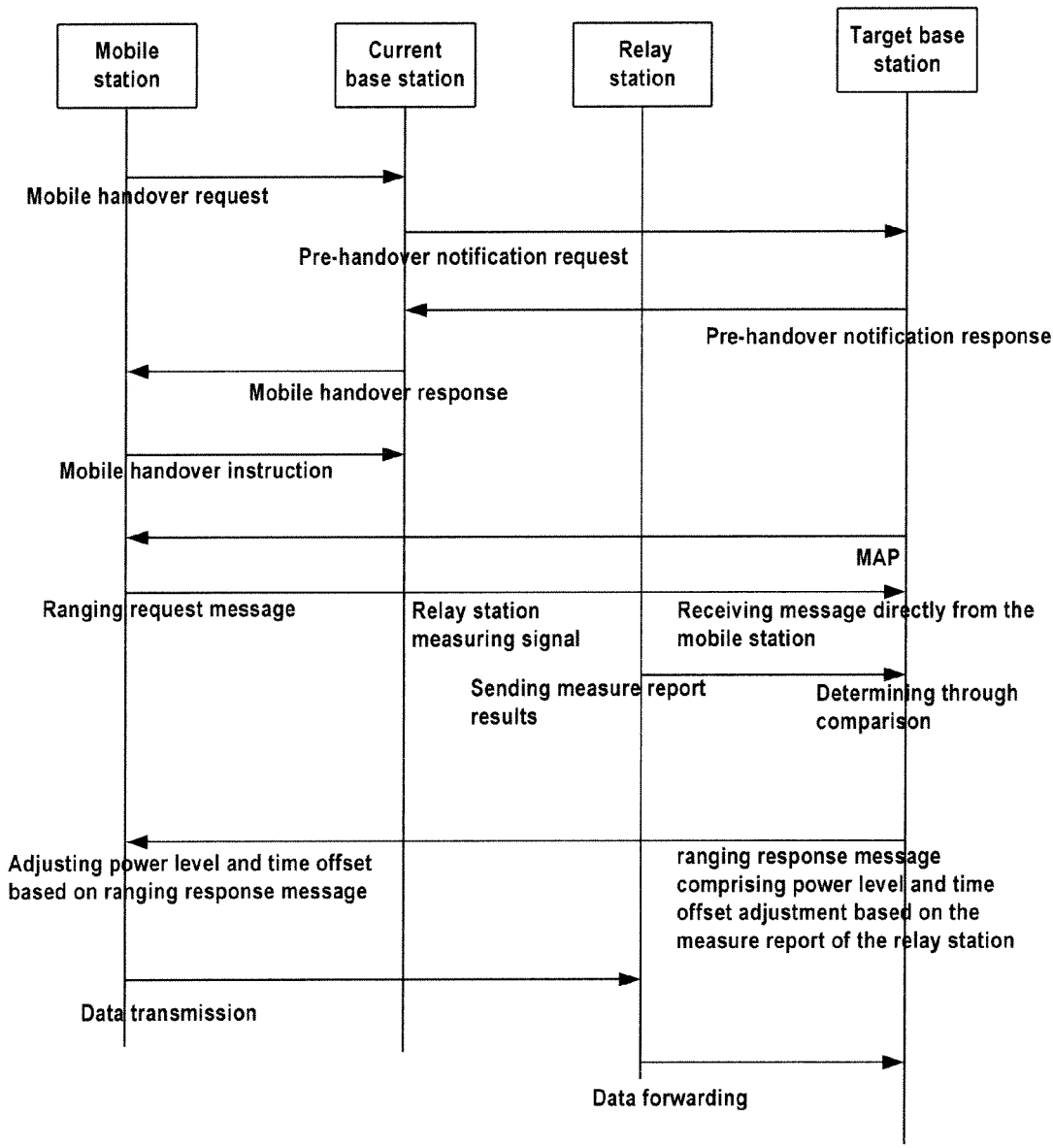
FIG. 10 shows a diagram of a cross-base station handover process of a mobile station from a current base station to a relay station of an neighboring target base station according to a preferred embodiment of the present invention.

With a purpose of better illustration of the mobile station cross-base station process, FIG. 9 shows in detail the handover process from a relay station within the coverage of current base station to the target base station according to an embodiment of the present invention. Before the handover, the mobile station is located within the coverage of a relay station of the current base station, and all the message communication except the downlink control message is forwarded by the relay station. Thus, in the handover preparation period, all handover message communication such as Mobile Handover Request (MOB_HO_REQ) and Mobile Handover Instruction (MOB_HO_IND) is firstly received by the relay station and then forwarded to the current base station through the reserved relay zone. And all the downlink control signals directly arrive at the mobile station. In the following process, the mobile station performs CDMA ranging and is associated with the target base station, and the process is completely identical to a standard process. Thus the description thereof is omitted. FIG. 10 shows in detail the cross-base station handover process from a current base station to a relay station within coverage of a target base station. What's different is that during the handover preparation period, the mobile station transmits some handover preparation messages to the current base station, which ignores the existence of the relay station. The real handover starts with the re-ranging of the target base station, and meanwhile the relay station starts to participate in the handover. Besides, in the network entry and initialization, the relay station plays a similar role as in the handover process within the same base station. Through comparing the measure results, the target base station determines whether to use relay and returns the ranging response message to the mobile station so as to adjust the power level and time offset. Further, another scenario is a handover from a relay station to another relay station within coverage of an neighboring base station, which is a combination of the above two scenarios, thus further description thereof is omitted.

In addition, in an embodiment, the mobile station cross-base station handover preparation step may further comprise: at least one base station providing signal strength information of a relay station within its own coverage to the current base station; the current base station determining a target base station based on the information provided by the mobile station and the relay station information provided by at least one base station.

III. Mobility of a Relay Station

Figure 11:
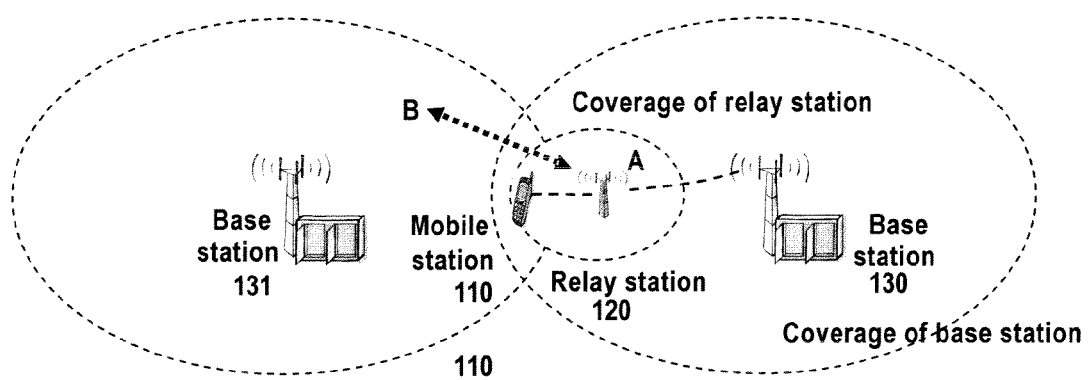
FIG. 11 shows a networking state of a relay station cross-base station handover in a wireless access system according to a preferred embodiment of the present invention.

FIG. 11 shows a networking state of a relay station cross-base station handover in a wireless access system according to a preferred embodiment of the present invention, wherein the relay station 120 moves from position A to position B, which requires processing handover of the relay station from the base station 130 and the base station 131, vice versa.

A mobile relay station can get support from the standard IEEE802.16j. Thus, the mobility of a relay station and its influence on the mobile station service needs to be considered. In roaming, a relay station has the same process as a mobile station, except that the base station allocates a special identifier CID for identifying the relay station and the target base station also identifies the relay station through the CID.

As to a mobile station within the coverage of a relay station, there have the following cases: the mobile station within the coverage of the relay station moves with the relay station; the mobile station does not move with the relay station; and with the moving of the relay station, some new mobile stations may enter the coverage of the relay station.

As to the mobile station moving with the relay station, the mobile station handover shall be considered as well as the relay station handover. Thus, in this case, all mobile stations are required to follow the cross-base station handover process, and such process is implemented after the relay station handover. When the relay station handover is completed, all mobile stations within the relay station coverage will perform cross-base station handover process and manage to be synchronized with the relay station. The handover may result in delay of some services. At this point, we see that the relay station and all mobile stations follow the standard handover process. The base station and the relay station do not require additional functionality. To save time, some functionalities of mobile station handover are simplified or ignored. For example, since the relay station-mobile station channel condition is unchangeable, re-ranging may be set as optional. Before the relay station completes its handover, the mobile station is configured to start handover process so as to save time. In other words, the relay station handover process and the mobile station handover process overlap partially in some cases. To save time, some mobile stations are configured to implement the cross-base station handover process simultaneously.

The present invention realizes handover functionality in a mobile multi-hop wireless relay system, comprising moving and handover of a mobile station between relay stations, or moving and handover of mobile station between a base station and a relay station, or moving and handover of a relay station between base stations. The centralization resource allocation and control solution enables the base station to allocate resources to a mobile station and a relay station within the coverage and to completely control the handover process, wherein the selection and determination of a relay station is determined under the control of the base station. The handover control method of the present invention has no relationship with the frame structure definition, which is adapted to different relay frame structure definitions, comprising a corresponding throughput enhancement relay frame structure and coverage extension relay frame structure. The throughput enhancement relay is defined as: a mobile station is located within coverage of a base station, the downlink control message of the base station may arrive directly at the mobile station without passing through a relay station, and the main function of the relay station is to enhance the throughput of the mobile station. The coverage extension relay is defined as: a mobile station is located beyond coverage of a base station, the downlink control message of the base station can not arrive directly at the mobile station, all message interaction (including bearer data and control message) between the mobile station and the base station must be relayed by a relay station, and the main function of the relay station is to enhance base station coverage.

Figure 12:
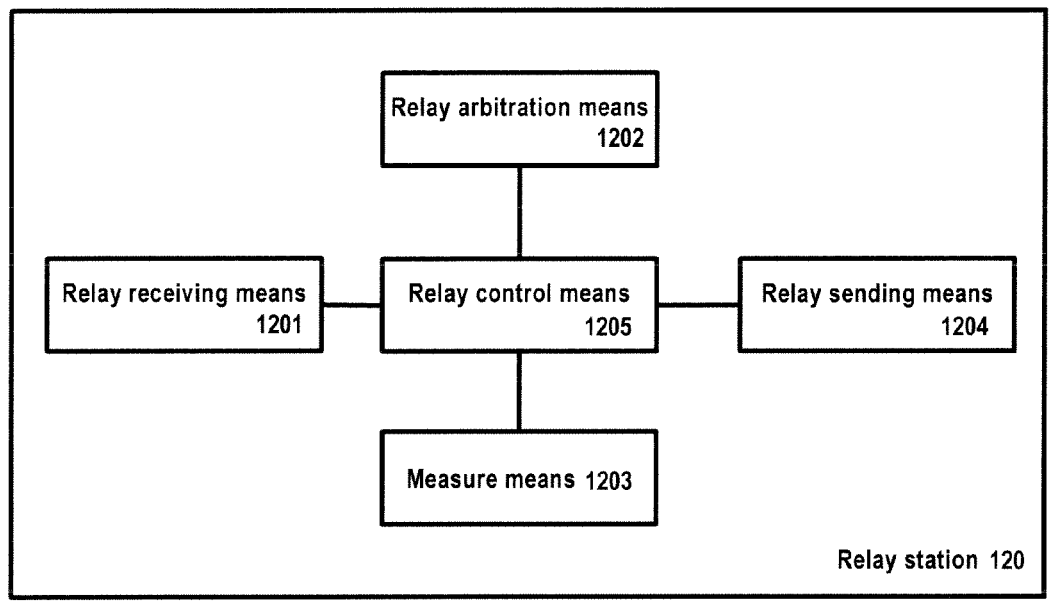
FIG. 12 shows a structural diagram of a relay station according to a preferred embodiment of the present invention.

Based on what is described above, to implement the above method for control wireless access, the present invention provides a relay station 120 as shown in FIG. 12, comprising: relay control means 1205 for controlling operation of a relay station; relay receiving means 1201 for receiving mobile station and base station message via a wireless channel; relay sending means 1204 for sending message to the mobile station and the base station via the wireless channel; measure means 1203 for measuring signal strength of message sent from the mobile station and ranging the mobile station; relay arbitration means 1202 for analyzing and arbitrating signal strength of the message sent by the mobile station. If the message signal is strong, the relay station forwards the message or sends a measure report to the base station; if the message signal is weak, the relay station ignores the message sent by the mobile station. Under the control of the relay control means, the relay receiving means receives the message, the relay measure means measures signal strength of the message, the relay arbitration means analyzes and arbitrates the signal measure result and then determines whether to forward the message by the relay sending means, and the relay receiving means receives the special connection identifier sent from the base station. The relay station and the wireless channel uses an Orthogonal frequency-division multiplexing (OFDM) frame structure including an uplink frame where a dedicated control information relay zone is provided.

Figure 13:
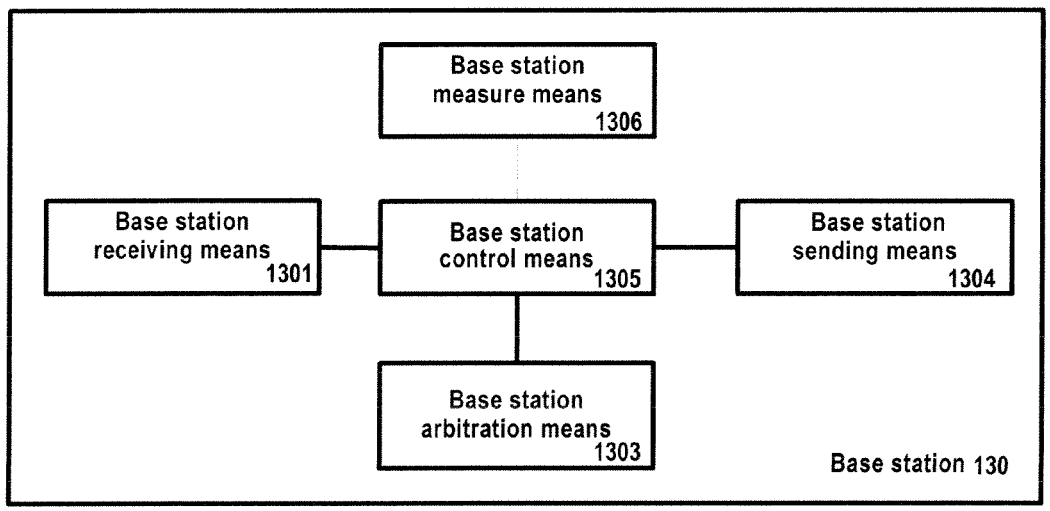
FIG. 13 shows a structural diagram of a base station according to a preferred embodiment of the present invention.

Further, to achieve the object of the present invention, there is also provided an improved base station 130, as shown in FIG. 13, comprising: a base station control means 1305 for controlling operation of a base station; a base station receiving means 1301 for receiving message from the mobile station and the relay station via a wireless channel; a base station sending means 1304 for sending message to the mobile station and the relay station via the wireless channel; a base station measure means 1306 for measuring signal strength of the message sent by the mobile station, a base station arbitration means 1303 for comparing signal strength measured by the relay station and the signal strength of the message sent by the mobile station measured by the base station measure means 1306, so as to arbitrate whether relay handover is required; a base station control means 1305 instructs the base station sending means 1304 to return a ranging response message back to the mobile station, the ranging response message comprising radio frequency power level and synchronization offset correction adjusted based on the relay station signal measure information. Under the control of the base station control means, the message received by the base station receiving means is sent to the base station measure means to measure. Through the analysis and arbitration by the base station arbitration means, the base station sending means sends message to the relay station and the mobile station, and the base station sending means sends a special connection identifier to the relay station. The relay station and the wireless channel uses an Orthogonal Frequency-Division Multiplexing (OFDM) frame structure including an uplink frame where a dedicated control information relay zone is provided.

Although the embodiments of the present invention have been described with reference to the drawings, various variations or modifications can be made by those skilled in the art within the scope of the accompanying claims.

What is claimed is:

1. A method for control of a handover of a mobile station in a wireless access system, comprising:
   receiving an uplink message from a mobile station at a first relay station via a wireless channel, wherein the uplink message includes a ranging request message or an uplink data burst, wherein the wireless channel includes an uplink channel and a downlink channel;
   measuring signal strength of the uplink message at the first relay station;
   analyzing and arbitrating the signal strength of the uplink message at the first relay station to determine whether to forward the uplink message to a base station;
   forwarding the uplink message from the first relay station to the base station via the wireless channel through a dedicated control information relay zone reserved for forwarding uplink control information after determining the signal strength of the uplink message measured at the first relay station exceeds a predetermined strong value;
   receiving the uplink message from at least one of the mobile station and the first relay station at the base station via the wireless channel;
   measuring signal strength of the uplink message(s) received at the base station; and
   analyzing and arbitrating the signal strength of the uplink message(s) received at the base station and link budgets at the base station to determine whether a handover of the mobile station involving the first relay station is required based at least in part on the measured signal strength.

2. The method according to claim 1, further comprising:
   ignoring the uplink message
   received by the first relay station
   after determining the signal strength of the uplink message measured at the first relay station
   does not exceed the predetermined strong value.

3. The method according to claim 1, further comprising:
   determining the handover of the mobile station is required while the mobile station is using relay service from the first relay station and that the handover is from the first relay station to the base station based at least in part on the analyzing and arbitrating by the base station;
   sending a ranging response message to the mobile station from the base station with adjustments for the handover to the base station; and
   sending a relay service message to the first relay station from the base station to cancel relay service to the mobile station.

4. The method according to claim 1, further comprising:
   receiving the uplink message from the mobile station at a second relay station via the wireless channel;
   measuring signal strength of the uplink message at the second relay station;
   analyzing and arbitrating the signal strength of the uplink message at the second relay station to determine whether to forward the uplink message to the base station;
   forwarding the uplink message from the second relay station to the base station via the wireless channel through a dedicated control information relay zone reserved for forwarding uplink control information after determining the signal strength of the uplink message measured at the second relay station exceeds the predetermined strong value;
   receiving the uplink message from the second relay station at the base station via the wireless channel;
   measuring signal strength of the uplink message received from the second relay station at the base station;
   analyzing and arbitrating the signal strength of the uplink message(s) received at the base station and link budgets at the base station to determine whether a handover of the mobile station involving the first and second relay stations is required based at least in part on the measured signal strength;

determining the handover of the mobile station is required while the mobile station is using relay service from the first relay station and not using relay service from the second relay station and that the handover is from the first relay station to the second relay station based at least in part on the analyzing and arbitrating by the base station;

sending a ranging response message to the mobile station from the base station with adjustments for the handover to the second relay station;

sending a first relay service message to the first relay station from the base station to cancel relay service to the mobile station; and sending a second relay service message to the second relay station from the base station to provide relay service to the mobile station.

5. The method according to claim 1 further comprising:
receiving the uplink message from the mobile station at a second relay station via the wireless channel;
measuring signal strength of the uplink message at the second relay station;
analyzing and arbitrating the signal strength of the uplink message at the second relay station to determine whether to forward the uplink message to the base station;
forwarding the uplink message from the second relay station to the base station via the wireless channel through a dedicated control information relay zone reserved for forwarding uplink control information after determining the signal strength of the uplink message measured at the second relay station exceeds the predetermined strong value;
receiving the uplink message from the second relay station at the base station via the wireless channel;
measuring signal strength of the uplink message received from the second relay station at the base station;
analyzing and arbitrating the signal strength of the uplink message(s) received at the base station and link budgets at the base station to determine whether a handover of the mobile station involving the second relay station is required based at least in part on the measured signal strength;
determining the handover of the mobile station is required while the mobile station is not using relay service from the first relay station and not using relay service from the second relay station and that the handover is from the base station to the second relay station based at least in part on the signal strength associated with the uplink message received from the second relay station being stronger than the signal strength of the uplink message received from the first relay station;
sending a ranging response message to the mobile station from the base station with adjustments for the handover to the second relay station; and
sending a relay service message to the second relay station from the base station to provide relay service to the mobile station.

6. The method according to claim 1, further comprising:
determining the handover of the mobile station is required while the mobile station is not using relay service from the first relay station and that the handover is from the base station to the first relay station based at least in part on the analyzing and arbitrating by the base station;
sending a ranging response message to the mobile station from the base station with adjustments for the handover to the first relay station; and
sending a relay service message to the first relay station from the base station to provide relay service to the mobile station.

7. The method according to claim 1, further comprising:
determining a cross-base station mobile station handover is required to handover the mobile station from the base station to a neighboring base station; and
determining a cross-base station relay station handover is required to handover the first relay station from the base station to a neighboring base station.

8. A relay station configured to operate in a wireless access system, comprising:
a relay control processor configured to control operation of the relay station;
a relay receiver configured to receive an uplink message from a mobile station via a wireless channel, wherein the uplink message includes a ranging request message or an uplink data burst, wherein the wireless channel includes an uplink channel and a downlink channel;
a relay measurement processor configured to measure signal strength of the uplink message;
a relay arbitration processor configured to analyze and arbitrate the signal strength of the uplink message to determine whether to forward the uplink message to a base station; and
a relay transmitter configured to forward the uplink message to the base station via the wireless channel through a dedicated control information relay zone reserved for forwarding uplink control information after the relay arbitration processor determines the signal strength of the uplink message measured by the relay measurement processor exceeds a predetermined strong value;
wherein the relay control processor is in operative communication with the relay receiver, relay transmitter, relay measurement processor, and relay arbitration processor.

9. The relay station according to claim 8 wherein the relay receiver is configured to receive a relay service message from the base station to cancel relay service to the mobile station after the base station determines a handover of the mobile station is required while the mobile station is using relay service from the relay station and that the handover is from the relay station to the base station.

10. The relay station according to claim 8 wherein the relay receiver is configured to receive a relay service message from the base station to provide relay service to the mobile station after the base station determines a handover of the mobile station is required while the mobile station is not using relay service from the relay station and that the handover is from the base station to the relay station.

11. The relay station according to claim 8 wherein the relay station is configured to ignore the uplink message after the arbitration processor determines the signal strength of the uplink message measured by the relay measurement processor does not exceed the predetermined strong value.

12. The relay station according to claim 8 wherein the relay receiver is configured to receive a relay service message from the base station to cancel relay service to the mobile station after the base station determines a handover of the mobile station is required while the mobile station is using relay service from the relay station and that the handover is from the relay station to another relay station.

13. The relay station according to claim 8 wherein the relay receiver is configured to receive a relay service message from the base station to provide relay service to the mobile station after the base station determines a handover of the mobile station is required while the mobile station is not using relay service from the relay station and that the handover is from the another relay station to the relay station.

14. A base station configured to operate in a wireless access system, comprising:
   a base station control processor configured to control operation of the base station;
   a base station receiver configured to receive an uplink message generated by a mobile station and forwarded by a first relay station via a wireless channel through a dedicated control information relay zone reserved for forwarding uplink information after the first relay station received the uplink message from the mobile station and determined the signal strength exceeded a predetermined strong value, wherein the uplink message includes a ranging request message or an uplink data burst, wherein the wireless channel includes an uplink channel and a downlink channel;
   a base station measurement processor configured to measure signal strength of the uplink message; and
   a base station arbitration processor configured to analyze and arbitrate the signal strength of the uplink message received by the base station receiver and link budgets at the base station to determine whether a handover of the mobile station involving the first relay station is required based at least in part on the measured signal strength;
   wherein the base station control processor is in operative communication with the base station receiver, base station measurement processor, and base station arbitration processor.

15. The base station according to claim 14 wherein the base station arbitration processor is configured to determine a handover of the mobile station is required while the mobile station is using relay service from the first relay station and that the handover is from the first relay station to the base station based at least in part on the analyzing and arbitrating, the base station further comprising:
   a base station transmitter configured to send a ranging response message to the mobile station with adjustments for the handover from to the base station and configured to send a relay service message to the first relay station to cancel relay service to the mobile station, wherein the base station transmitter is in operative communication with the base station control processor.

16. The base station according to claim 14 wherein the base station arbitration processor is configured to determine a handover of the mobile station is required while the mobile station is not using relay service from the first relay station and that the handover is from the base station to the first relay station based at least in part on the analyzing and arbitrating, the base station further comprising:
   a base station transmitter configured to send a ranging response message to the mobile station with adjustments for the handover to the first relay station and configured to send a relay service message to the first relay station to provide relay service to the mobile station, wherein the base station transmitter is connected to the base station control processor.

17. The base station according to claim 14 wherein the base station receiver is configured to receive the uplink message directly from the mobile station via the wireless channel.

18. The base station according to claim 14 wherein the base station receiver is configured to receive the uplink message from a second relay station via the wireless channel through a dedicated control information relay zone reserved for forwarding uplink information, wherein the base station measurement processor is configured to measure signal strength of the uplink message received from the second relay station, wherein the base station arbitration processor is configured to analyze and arbitrate the signal strength of the uplink messages received by the base station receiver and link budgets at the base station to determine whether a handover of the mobile station involving the first and second relay stations is required based at least in part on the measured signal strength, wherein the base station arbitration processor is configured to determine the handover of the mobile station is required while the mobile station is using relay service from the first relay station and not using relay service from the second relay station and that the handover is from the first relay station to the second relay station based at least in part on the analyzing and arbitrating, the base station further comprising:
   a base station transmitter configured to send a ranging response message to the mobile station with adjustments for the handover to the second relay station, configured to send a first relay service message to the first relay station to cancel relay service to the mobile station, and configured to send a second relay service message to the second relay station to provide relay service to the mobile station, wherein the base station transmitter is in operative communication with the base station control processor.

19. The base station according to claim 14 wherein the base station receiver is configured to receive the uplink message from a second relay station via the wireless channel through a dedicated control information relay zone reserved for forwarding uplink information, wherein the base station measurement processor is configured to measure signal strength of the uplink message received from the second relay station, wherein the base station arbitration processor is configured to analyze and arbitrate the signal strength of the uplink messages received by the base station receiver and link budgets at the base station to determine whether a handover of the mobile station involving the second relay station is required based at least in part on the measured signal strength, wherein the base station arbitration processor is configured to determine the handover of the mobile station is required while the mobile station is not using relay service from the first relay station and not using relay service from the second relay station and that the handover is from the base station to the second relay station based at least in part on the signal strength associated with the uplink message received from the second relay station being stronger than the signal strength of the uplink message received from the first relay station, the base station further comprising:
   a base station transmitter configured to send a ranging response message to the mobile station with adjustments for the handover to the second relay station and configured to send a relay service message to the second relay station to provide relay service to the mobile station, wherein the base station transmitter is in operative communication with the base station control processor.

20. A method for control of a handover of a mobile station in a wireless access system, comprising:
   at a current base station, receiving a mobile handover request generated by a mobile station, wherein the mobile station and current base station are associated with a wireless access system and the mobile station is currently within coverage of the current base station;
   sending a pre-handover notification request message from the current base station to at least one neighboring base station, each neighboring base station associated with the wireless access system;

receiving a pre-handover notification response message at the current base station from one or more neighboring base stations to which the pre-handover notification request message was sent, wherein the pre-handover notification response message from at least one of the one or more neighboring base stations includes signal strength information relating to the corresponding ranging request message or uplink data burst received by a relay station within coverage of the corresponding neighboring base station;

arbitrating the corresponding pre-handover notification response messages at the current base station and determining a target base station from among the at least one neighboring base station at the current base station based on the signal strength information provided by each corresponding neighboring base station in the pre-handover notification response messages;

sending a mobile handover response from the current base station to the mobile station identifying the target base station; and at the current base station, receiving a mobile handover instruction generated by the mobile station, wherein the target base station sends an uplink MAP message to the mobile station and the mobile station changes its preamble to be synchronized with that of the target base station.

21. The method of claim 20, further comprising:

at the target base station, receiving a ranging request message or an uplink data burst generated by the mobile station via a wireless channel, wherein the mobile station is currently within coverage of the target base station;

measuring a signal strength of the corresponding ranging request message or uplink data burst at the target base station; and analyzing arbitrating the signal strength and link budgets at the target base station to determine whether a handover of the mobile station involving at least one relay station is required, the at least one relay station being within coverage of the target base station.

22. The method of claim 21 wherein the mobile handover request and the mobile handover instruction are received by the current base station from a current relay station providing relay service to the mobile station, the current relay station associated with the wireless access system and within coverage of the current base station, the mobile station within coverage of the current relay station in conjunction with generation of the mobile handover request and the mobile handover instruction;

wherein the corresponding ranging request message or uplink data burst is received by the target base station from a second relay station, the second relay station associated with the wireless access system and within coverage of the target base station, the mobile station within coverage of the second relay station in conjunction with generation of the corresponding ranging request message or uplink data burst;

wherein the target base station determines a handover of the mobile station from the target base station to the second relay station is required in conjunction with arbitrating the signal strength and link budgets while the mobile station is in a state of not using relay service from the second relay station, the method further comprising:

sending a ranging response message to the mobile station from the target base station with adjustments for the handover from the target base station to the second relay station; and sending a relay service message to the second relay station from the target base station to provide relay service to the mobile station.

23. The method of claim 21 wherein the corresponding ranging request message or uplink data burst is received by the target base station from a first relay station, the first relay station associated with the wireless access system and within coverage of the target base station, the mobile station within coverage of the first relay station in conjunction with generation of the corresponding ranging request message or uplink data burst;

wherein the target base station determines a handover of the mobile station from the target base station to the first relay station is required in conjunction with arbitrating the signal strength and link budgets while the mobile station is in a state of not using relay service from the first relay station, the method further comprising:

sending a ranging response message to the mobile station from the target base station with adjustments for the handover from the target base station to the first relay station; and sending a relay service message to the first relay station from the target base station to provide relay service to the mobile station.

* * * * *